(12) United States Patent
Thorpe

(10) Patent No.: US 9,308,928 B2
(45) Date of Patent: Apr. 12, 2016

(54) PORTABLE CONVENIENCE CART

(71) Applicant: Thorpe Product Solutions, LLC, Southfield, MI (US)

(72) Inventor: Acquanita Thorpe, Southfield, MI (US)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/575,305

(22) Filed: Dec. 18, 2014

(65) Prior Publication Data

US 2015/0175185 A1  Jun. 25, 2015

Related U.S. Application Data

(60) Provisional application No. 61/918,316, filed on Dec. 19, 2013.

(51) Int. Cl.
*B62B 3/02* (2006.01)

(52) U.S. Cl.
CPC ........................................ *B62B 3/022* (2013.01)

(58) Field of Classification Search
CPC .............. B62B 3/02; B62B 5/00; B62B 9/12; B62B 9/28
USPC ................. 280/639, 651, 656, 47.34
See application file for complete search history.

(56) References Cited

U.S. PATENT DOCUMENTS

| | | | |
|---|---|---|---|
| 6,155,592 A | 12/2000 | Hsia | |
| 6,354,619 B1 | 3/2002 | Kim | |
| 6,702,313 B2 * | 3/2004 | Forshee | B62B 5/002 280/304.1 |
| 7,226,059 B1 * | 6/2007 | Samuels | B62B 3/027 280/33.991 |
| 8,528,919 B2 * | 9/2013 | Webster | B62B 3/008 280/651 |
| 8,820,522 B2 * | 9/2014 | Quarry et al. | 206/315.1 |
| 8,882,135 B1 * | 11/2014 | Chen | 280/651 |
| 2007/0187910 A1 * | 8/2007 | Adams | 280/1.5 |
| 2009/0212536 A1 * | 8/2009 | Tadeo | A45C 7/02 280/655 |
| 2011/0017564 A1 | 1/2011 | Fan | |
| 2012/0199716 A1 * | 8/2012 | Youngblood | 248/316.1 |

FOREIGN PATENT DOCUMENTS

| | | |
|---|---|---|
| GB | 2497620 A | 6/2013 |
| JP | 2009190716 A | 8/2009 |

OTHER PUBLICATIONS

English Abstract and translation for JP 2009190716A.

* cited by examiner

*Primary Examiner* — Bryan Evans
(74) *Attorney, Agent, or Firm* — Fishman Stewart PLLC

(57) ABSTRACT

A portable, detachable cart may include a cargo basket defining an interior and having at least one opening. The cart may include a collapsible cart frame mounting the cargo basket. The cart frame may include a base frame having a plurality of supports extending from a center plate. The supports may be pivotally coupled to the center plate on a first end. A side frame may have a plurality of frame members pivotally coupled to a second end of the respective supports opposite the first end. A plurality of wheel assemblies may extend from the side frame. The cart frame may be selectively collapsible between a collapsed state and an un-collapsed state. The detachable cart may include at least one linking member extending from at least one of the base frame, the side frame and the cargo basket.

8 Claims, 5 Drawing Sheets

US 9,308,928 B2

PORTABLE CONVENIENCE CART

CROSS-REFERENCE TO RELATED APPLICATIONS

This application claims priority to U.S. Provisional Patent Application No. 61/918,316, filed Dec. 19, 2013, the contents of which are hereby incorporated by reference in their entirety.

FIELD OF TECHNOLOGY

The present disclosure refers to a portable cart, and more particularly to a detachable, collapsible cart for attaching to a transportable person carriage.

BACKGROUND

Parents of infants and young children, seniors with walkers or anyone who has to juggle pushing a wheeled stroller, walker or the like with one hand while trying to obtain and transport items with the other hand has no doubt run into frustrations at some point or another. The need to conveniently and safely transport loads and/or multiple items for these individuals in today's busy fast paced world has all but become a necessity. Multi-tasking has become the new norm, however, it is difficult for one to control something like a stroller, walker or the like; gather the items and push a cart at the same time while trying to accomplish activities such as shopping, navigating at the community laundry mat or simply trying to get from point A to point B. While it is possible for child strollers to carry packages, there is limited room and weight bearing capacity. Further, it may be dangerous as it is not the intended use because strollers are specifically designed to hold and transport infants, small children and a limited amount of items. It is also possible for one to use one of the many already designed push carts currently in the market, however, carts of this nature are generally of substantial construction and are typically provided by department stores, food markets, shopping malls or the like and are generally inferior in safety and quality as compared to wheeled strollers, wheelchairs, walkers, etc.

Therefore, it has become increasingly desirable to provide a hands-free attachable, collapsible, light-weight, convenient transport cargo cart designed specifically for use with transportable person carriages, for example strollers, walkers, wheel chairs and the like to improve the above-mentioned concerns.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows:

DETAILED DESCRIPTION

Figure 1:
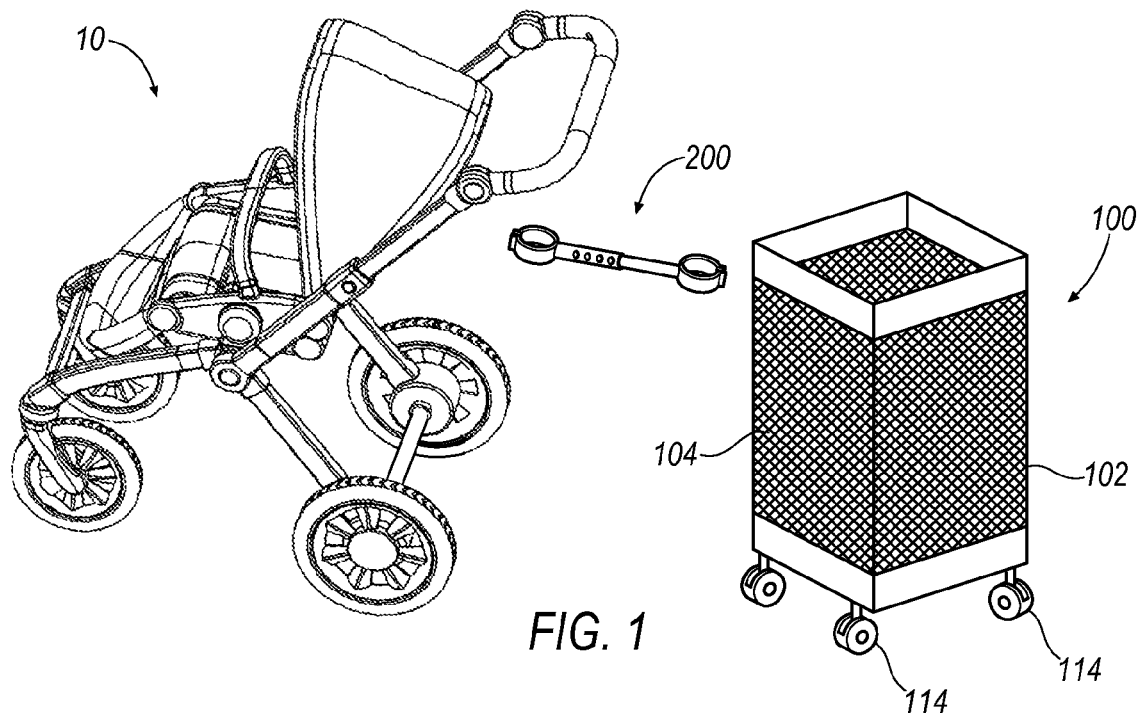
FIG. 1 illustrates a perspective view of an exemplary detachable cart for use with a person carriage.

Various exemplary illustrations of a detachable cart are provided herein. The detachable cart may be used in connection with a person carriage such as a stroller, a wheel chair, and a rolling walker. It should be understood that the detachable cart may be used with many different types of transport vehicles, and should not be limited to those described herein.

According to one example, a portable, detachable cart may include a cargo basket defining an interior and having at least one opening. The cart may include a collapsible cart frame mounting the cargo basket. The cart frame may include a base frame having a plurality of supports extending from a center plate. The supports may be pivotally coupled to the center plate on a first end. A side frame may have a plurality of frame members pivotally coupled to a second end of the respective supports opposite the first end. A plurality of wheel assemblies may extend from the side frame. The cart frame may be selectively collapsible between a collapsed state, in which the center plate of the base frame is raised in a first vertical position and the frame members of the side frame are in an innermost position relative to a center axis of the cart frame, and an un-collapsed state, in which the center plate of the base frame is disposed in a second vertical position less than the first vertical position and the frame members of the side frame are in an outermost position relative to the center axis of the cart frame. The detachable cart may include at least one linking member extending from at least one of the base frame, the side frame and the cargo basket.

According to another example, a collapse cart for attaching to a transportable person carriage is disclosed. The collapsible cart may include a cargo basket defining an interior and including at least one opening. The collapsible cart may include a cart frame mounting the cargo basket. The cart frame may include a base frame having a plurality of supports extending from a center plate. The supports may be pivotally coupled to the center plate. The collapsible cart may include a side frame defining a periphery of the cart frame and having a plurality of frame members pivotally coupled to the respective supports of the base frame. The base frame and the side frame may be selectively collapsible between a collapsed state and an un-collapsed state, such that in the collapsed state the center plate is in an uppermost position and in the un-collapsed state the center plate is in a lowermost position relative to a surface. The cart frame may include a plurality of wheel assemblies extending from at least one of the base frame and the side frame. The collapsible cart may include at least one linking member extending from at least one of the base frame, the side frame and the cargo basket. The linking member may include a telescoping arm configured to elongate between a first arm extent and a second arm extent greater than the first arm extent. The linking member may be connectable to at least one of an axle and a frame of the transportable person carriage.

Pursuant to another example, a collapsible cart for attaching to a transportable person carriage may include a cart frame. The cart frame may include a base frame including a plurality of supports extending from a center plate. The supports may have a first end pivotally coupled to the center plate via an associated connecting element. The cart frame may include a side frame defining a periphery of the cart frame, the side frame including a plurality of side frame members pivotally coupled to a second end of the respective supports. The cart frame may include a plurality of base frame members respectively extending from one side frame member to another side frame member disposed peripherally adjacent thereto. The base frame members may include at least two tubular components pivotally coupled on one end to the associated side frame member and on the other end to a joint. The joint may react with adjacent ends of the at least two tubular components to permit pivoting movement in one direction only from a position in which the at least two components are in linear prolongation of one another. The cart frame may include a plurality of wheel assemblies coupled to at least one of the base frame and the side frame. At least one linking member may extend from at least one of the base frame, the side frame and at least one of the plurality of base frame members. The linking member may be connectable to the transportable person carriage. The cart frame may be selectively collapsible between a collapsed state and an un-collapsed state, such that in the un-collapsed state the center plate is in a lowermost position relative to a surface and the at least two tubular components of the respective base frame members are in linear prolongation of one another.

Referring now to FIG. 1, a detachable cart 100 may be configured to couple, via a linking member 200, to a frame of a person carriage 10, such as a stroller, wheel chair, or the like, either in front, or the rear as shown. Accordingly, one person can simultaneously push the carriage 10 and carry items in the detachable cart 100, thereby relieving the person from manually carrying the item in hand. The detachable cart 100 may include a cart frame 102 and a cargo basket 104. The cart frame 102 may include collapsible side frame 106, a collapsible or foldable base frame 108, a top frame 110, and a plurality of wheel assemblies 114 coupled to the bottom of the cart 100 configured to swivel or move in the direction of the cart 100 (cf. FIG. 2).

Figure 2:
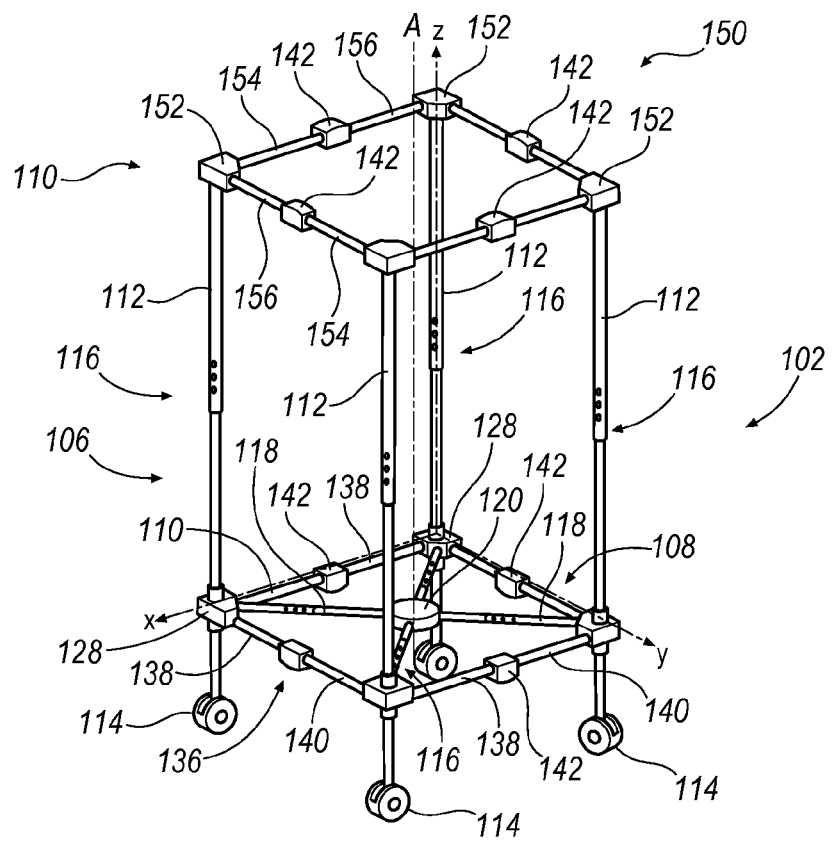
FIG. 2 illustrates a perspective view of an exemplary cart frame of the detachable cart in an un-collapsed state according to one example.

FIG. 2 illustrates a cart frame 102 in an un-collapsed or operating state. The side frame 106 may be composed of four parallel side frame members 112 vertically oriented relative to a surface on which the cart 100 traverses. The cart 100 may be configured as a quadrilateral (e.g., as a square or rectangle), and the side frame members 112 may define the four corners of the cart 100. However, other geometries are contemplated, such as circular geometries or geometries including more than 4 sides (e.g., pentagonal, hexagonal, heptagonal, etc.). The side frame members 112 may be formed of lightweight and durable material, and may be hollow to further reduce weight and increase transportability. The side frame members 112 may each include a wheel assembly 114 coupled to or otherwise extending from a bottom portion thereof. The wheel assemblies 114 may be integral with, or separate from, the associated side frame members 112. The wheel assemblies 114 may be operable to swivel to enhance control of the cart 100 when following a carriage 10.

Each side frame member 112 may be composed of a unitary structure, or may include multiple sections. For example, the respective side frame members 112 may be a telescoping member composed of a plurality of concentric tubular parts or sections that are slidable relative to one another. Accordingly, the side frame members 112 may be adjustable to elongate and contract in extent. The respective telescoping side frame members 112 may be configured to lock at various positions between a greatest elongated position and a smallest elongated position. According to one implementation, the respective side frame members 112 may constitute a telescoping member operable to elongate and constrict between the greatest elongated position and the lowest elongated position. The individual tubular sections of the respective telescoping side frame members 112 may be operable to lock in position via a locking mechanism 116 associated with each side frame members 112. According to the example illustrated in FIG. 2, the locking mechanism 116 may include a series of spaced apertures on the outer tubular section and a resilient switch (e.g., a push button) arranged on the inner tubular section that engages with one of the series of corresponding apertures on the outer tubular section, or vice versa. According to another example, the locking mechanism 116 may include a series of aligned apertures on the outer and inner tubular sections operable to receive a fastener (e.g., a pin, bolt, etc.). Additionally or alternatively, the locking mechanism 116 may include a clamp collar (not shown) encompassing the outer telescoping section to secure the outer telescoping section to the inner telescoping section in a fixed position. The side frame members 112 may each include one or more locking mechanisms 116.

Still referring to FIG. 2, the interaction of the telescoping side frame members 112 and locking mechanism 116 may vary an extent of the cart 100 along the z-axis, e.g., a vertical extent of the cart 100 may be varied to increase or decrease in extent. That is, the cart frame 102 may be adjustable in a direction along a longitudinal center axis A of the cart 100. Increasing the elongation of the side frame members 112 (e.g., via a plurality of telescoping sections) correspondingly increases the vertical extent of the cart 100, whereas decreasing the elongation of the side frame members 112 (e.g., constricting the side frame members 112) correspondingly decreases the vertical extent of the cart 100. The locking mechanism 116 may fix the telescoping side frame members 112 in position and consequently the vertical extent of the cart 100 at various positions between a highest vertical extent and a lowest vertical extent. Consequently, the vertical extent of the cart 100 may be adjusted to increase or decrease the capacity/volume available in the cart 100 for holding items.

Referring to FIGS. 2, 3, 4A and 4B, the base frame 108 may include a plurality of supports 118 pivotally conjoined and extending from a weight bearing center plate 120. The center plate 120 may be substantially central relative to the side frame members 112. The center plate 120 may be composed of any weight bearing material, including but not limited to metal, plastic, carbon fiber, graphite, or any combination thereof. The center plate 120 may include connecting elements 122 formed or secured (e.g., via welding, brazing, bolting, etc.) on the underside of the plate operable to fix the base supports 118 to the center plate 120. The connecting elements 122 may include loops (not shown) extending from the underside of the plate for connecting with the supports 118, or may include at least one vertically registered plate extending orthogonally from the center plate 120 as shown in FIG. 2. The connecting elements 122 may additionally include an opening to receive a fastener such that the center plate 120 and base support 118 may be collapsed and un-collapsed, as described in further detail below.

Figure 3:
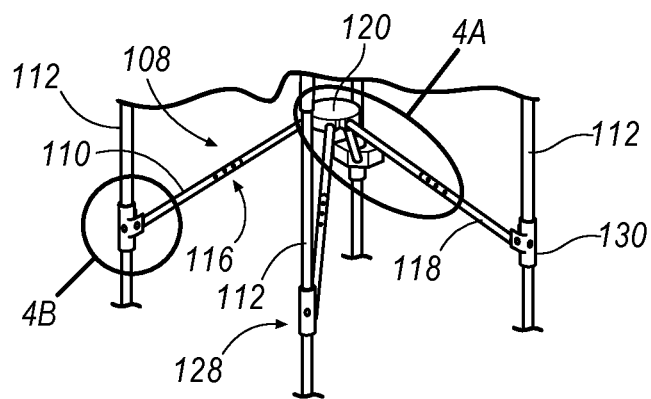
FIG. 3 illustrates a perspective view of an exemplary base frame of the detachable cart.
Figure 4B:
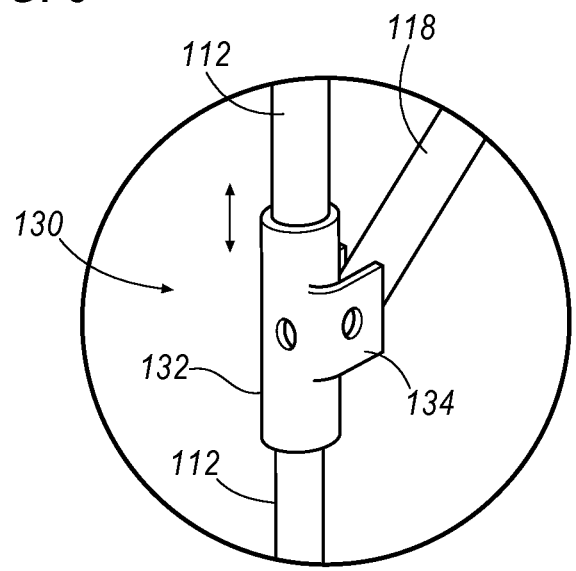
FIG. 4B illustrates an enlarged perspective view of a sleeve connection of FIG. 4.
Figure 4A:
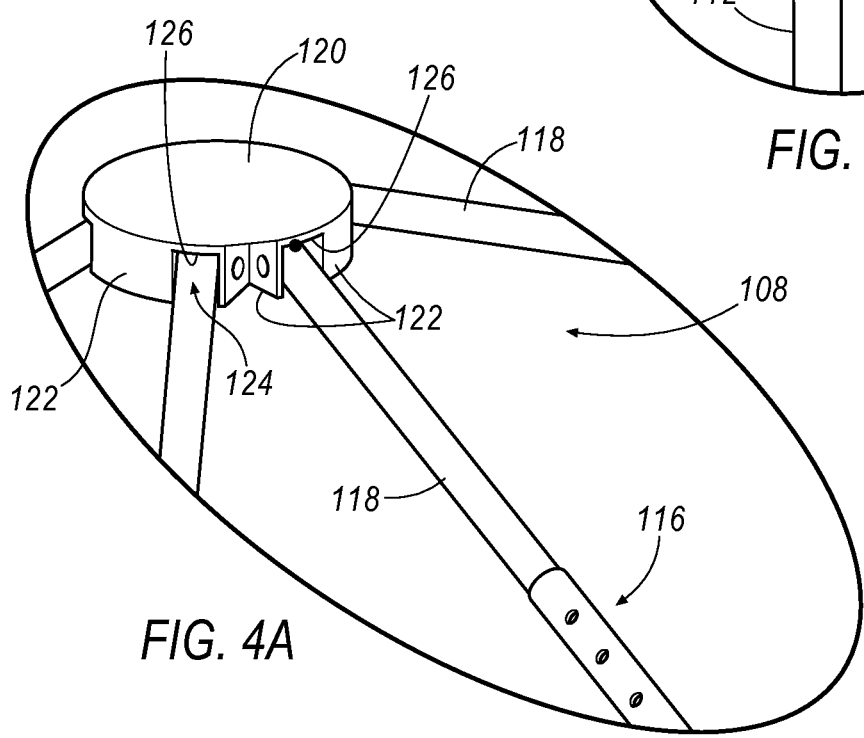
FIG. 4A illustrates an enlarged perspective view of the base frame of FIG. 3.

According to the example shown in FIGS. 3 and 4A, the connecting elements 122 of the center plate 120 may be arranged in pairs such that there are two connecting elements 122 for every base support 118. The connecting elements 122 may be arranged such that a slot 124 is created between each pair of connecting elements 122, the slot 124 configured to receive the supports 118 for mating. The connecting elements 122 and respective supports 118 may have aligned holes/openings for fixedly securing via receipt of bolts or pins. Additionally, the center plate 120 may include an abutment surface 126 and/or physical stop disposed on the underside of the center plate 120, e.g., disposed in the slots 124. The abutment surface 126 and/or physical stop may interact with the base supports 118 to prevent the center plate 120 from falling below a desired position in the un-collapsed or open state, and may also indicate when the center plate 120 is at its lowermost operating position (e.g., when the base supports 118 engage the abutment surface 126).

According to one implementation, the base supports 118 may be composed of a unitary member. According to another implementation, the base supports 118 may be composed of a plurality of support sections. The support sections may be securely fixed relative to one another. Additionally or alternatively, the base support 118 may be a telescoping member and the respective support sections may be operable to telescope into one another or otherwise fit and slide one within another to elongate and contract the length of the respective supports 118. The base support sections may be secured in position via a suitable locking mechanism 116 (e.g., mating a button with a corresponding opening(s), a clamping collar, etc.).

Consequently, referring in particular to FIG. 2, the cart 100 may be adjustable in at least one of a longitudinal extent (e.g., adjustable along the y-axis) and a lateral extent (e.g., along the x-axis) via the telescoping base supports 118 thereby increasing the cart's capacity to hold items. The longitudinal extent and the lateral extent of the cart 100 may be configured to increase and decrease in response to the base supports 118 elongating and contracting, respectively. Moreover, the cross-section of the cart 100 may be altered in response to adjusting some base supports 118 and not others. For instance, increasing the lateral extent of the cart 100 may transform the horizontal cross-section of the cart from substantially square to substantial rectangular. Accordingly, the capacity/volume of the cart to receive items may increase or decrease in response to elongating or contracting the supports 118, respectively, as well as its shape or cross-section.

Referring now to FIGS. 2, 3 and 4B, the side frame members 112 may be pivotally hinged to respective base supports 118 via a pivot connection 128. That is, the supports 118 may be pivotally secured to the side frame members 112 for collapsing and un-collapsing the frame. For example, the side frame members 112 and base supports 118 may be coupled via a fastener, such as a sleeve and pin or bolt. Additionally or alternatively, the bottom of the side frame member 112 may include a male end operable to articulate with a corresponding female end of the respective base support 118. In this manner, the side frame members 112 and base supports 118 may be assembled more conveniently by mating the male end with a female end. For example, the male end may be pivotally secured to the female end via a fastener (e.g., pin, bolt, etc.). Pursuant to another example, the male end may include a securing member (e.g., a latch or hook integrated to or separate from the side frame bar) that secures to a complementary receiving member on the female end (e.g., a loop or hole on the base support 118).

Pursuant to another implementation, the base frame 108 may be adjustably coupled to the side frame 106 to adjust the positioning of the base frame 108 relative to the ground, as illustrated in FIGS. 3 and 4B. For example, the base supports 118 may be slidably coupled to the body portion of the side frame members 112 via a sleeve connection 130. That is, the pivot connection 128 may encompass a sleeve connection 130. The sleeve connection 130 may include a sleeve 132 that fits around a shaft portion of the side frame members 112, and at least one connector 134 for receiving a mating piece (e.g., a flap or fitting opening extending from the sleeve 132 to receive a corresponding mating end of the base support 118). The sleeve 132 may be adjustably fixed to the side frame members 112 such that the sleeve 132 is slidable relative to the side frame members 112 (e.g., along the shaft of the side frame members 112). The sleeve 132 may be operable to tighten and loosen around the side frame member 112 for securing and unsecuring the sleeve 132 in position. Additionally or alternatively, the sleeve 132 may include an aperture operable to receive a resilient member (e.g., a push button) disposed on the corresponding side frame member 112. According to another example, the sleeves 132 and associated side frame members 112 may each include an aperture configured to receive a fastener (e.g., a screw or bolt). The sleeve 132 may be slidable relative to the associated side frame member 112 in an unsecured state to adjust a distance of the base frame 108 from the surface upon which the cart 100 traverses (e.g., a floor or the ground), thereby facilitating a clearance to avoid interrupting a walking motion by hitting ones feet on the base frame 108. The sleeve 132 may be integrated with, or separate from, the associated base support 118. According to an example, the sleeve 132, via the connectors 134, may be pivotally coupled with the associated base support 118 to allow pivoting of the base supports 118 relative to corresponding side frame members 112 to facilitate the transition of the cart 100 between the collapsed state and the un-collapsed state as later described in more detail.

As illustrated in FIG. 2, the base frame 108 may include hinged peripheral base frame members 136 connecting one side frame member 112 with another side frame member 112 to increase the structural integrity of the cart 100. The base frame members 136 may be included in addition to, or in lieu of, the center plate 120 and associated supports 118. The respective peripheral base frame members 136 may include two base member components, e.g., a first component 138 and a second component 140, each coupled on one end to the side frame member 112 and on the other end to each other via a joint 142. That is, the respective components 138, 140 of the base frame member 136 may include a sleeve end to be coupled to the sleeve connection 130 and a joint end to be coupled to the joint 142. The respective components 138, 140 of the base frame members 136 may be coupled on the sleeve end to the side frame member 112 via the sleeve connection 130. According to this example, the sleeve connection 130 may include a sleeve 132 and three connectors 134 for coupling the respective mating pieces of the base frame 108 to the side frame 106. The connectors 134 of the sleeve connection 130 may be operable to receive and secure mating ends of the base support 118 and the base member components 138, 140 on each side thereof.

Figure 6A:
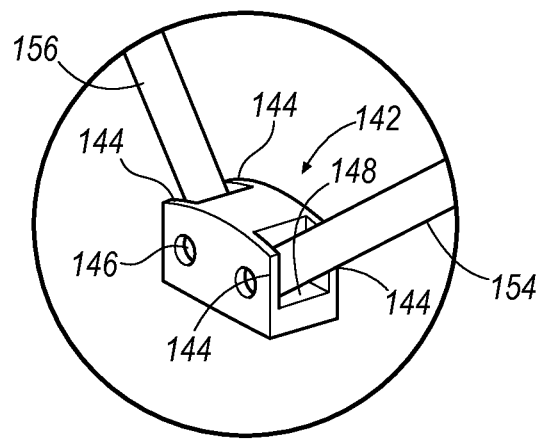
FIG. 6A is an enlarged perspective view of an exemplary joint.

The first and second components 138, 140 of the base frame member 136 may be coupled on the other end to the joint 142. The joint 142 couples the two components 138, 140 of the peripheral base frame members 136 together in a pivoting connection. The joint 142 may receive opposing mating ends of the respective base member components 138, 140 (e.g., the joint ends). Pursuant to one implementation, the joint 142 may encompass a knuckle joint (not shown) defined by a projection with an eye/aperture on the joint end of one piece (e.g., the first component 138) received in a jaw between two spaced apart loops with aligned eyes on the joint end of the other mating piece (e.g., the second component 140) and retained by a fastener. According to another implementation shown in FIG. 2 and illustrated in more detail in FIG. 6A, the joint 142 may include a pair of spaced apart loops 144 on each longitudinal end between which is accommodated a corresponding loop on the joint end of the base member components 138, 140. The loops 144 of the joint 142 and the joint end of the components 138, 140 may have aligned eyes or apertures 146 accommodating a fastener (e.g., a pivot pin or rivet) for hinging the adjacent base member components 138, 140 together.

Pursuant to one implementation, the joint 142 may allow limited relative pivoting movement of the peripheral base member components 138, 140 in one direction from a position in which the components 138, 140 are in linear prolongation to each other (e.g., when the cart 100 is in the un-collapsed state). The joint 142 may limit or stop pivotal movement of the peripheral base member components 138, 140 in the other direction via abutments 148 which prevent hyperextension of the components relative to the joint 142. The joint abutments 148 may engage the base member components 138, 140 at a position of linear prolongation to prevent hyperextension of the base member components 138, 140, and therefore only permit unidirectional pivoting action. In the example of a joint 142 associated with the base frame 108, the joint 142 may limit pivotal movement of the base member components 138, 140 in a direction towards the ground from the position of linear prolongation to prevent the base frame 108 from collapsing as a result of bearing the weight of items received in the cargo basket 104. Therefore, the joint 142 may function to connect two adjacent base member components 138, 140 as well as increase the structural rigidity and strength of the base frame 108.

The individual base member components 138, 140 may be operable to elongate and constrict, e.g., via telescoping component 138, 140 sections, to adjust a longitudinal extent and/or a lateral extent of the cart frame 102. Likewise, if a center plate 120 and associated supports 118 constitute part of the base frame 108, the base member components 138, 140 may be adjustable to compensate for a change in longitudinal extent and/or lateral extent resulting from elongation/contraction of the base supports 118. The member components 138, 140 may likewise have a suitable locking mechanism 116 to fix the member components 138, 140 in position, for instance as described above.

Referring to FIGS. 2, 5, 6A and 6B, the cart 100 may include a top frame 110 that may connect the side frame members 112 to each other. The top frame 110 may include hinged top frame members 150 and an elbow 152 associated with each side frame member 112. The top frame member 150 arrangement may be similar to the base frame members 136. The top frame members 150 may include two components (e.g., a first component 154 and a second component 156) pivotally coupled via a joint 142 similar to the joint 142 of the base frame 108. Thus, each component 154, 156 of the top frame members 150 may have an elbow end to be mated with the associated elbow 152 and a joint end to be mated with the associated joint 142. The joint 142, as previously described and illustrated in more detail in FIG. 6A, may allow relative pivoting movement of the top frame member components 154, 156 in one direction from which the components 154, 156 are in linear prolongation to each other. In this example, the joint 142 of the top frame 110 may permit a pivoting movement from linear prolongation solely in a direction of the base frame 108 to facilitate collapsing the cart 100. The joint 142 may limit or stop pivotal movement of the top frame members 150 in the other direction (e.g., in a direction away from the base frame 108) via an abutment surface 148 engaging each of the first component 154 and the second component 156 in a position in which the components 154, 156 are in linear prolongation to each other. Accordingly, the joint 142 prevents hyperextension of the respective top frame members 150.

Pursuant to one implementation, the top frame members 150 respectively may be operable to elongate and constrict, e.g., via at least two telescoping member sections, to compensate for a change in the longitudinal extent and/or lateral extent resulting from elongation/contraction of the base supports 118. The top frame members 150 may likewise have a suitable locking mechanism 116 to secure the telescoping sections of the top frame members 150 in position.

Figure 5:
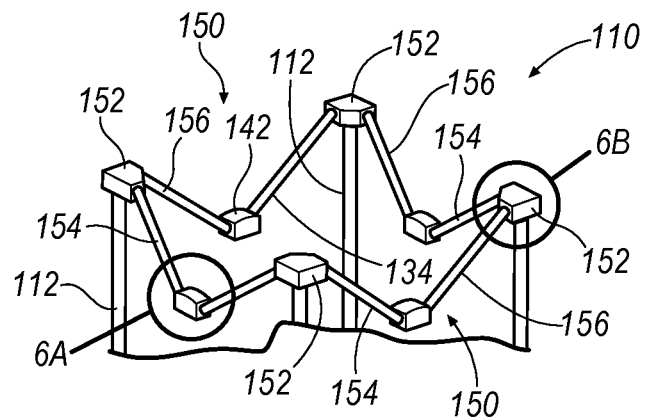
FIG. 5 illustrates a perspective view of a top frame of the detachable cart according to FIG. 1.
Figure 6B:
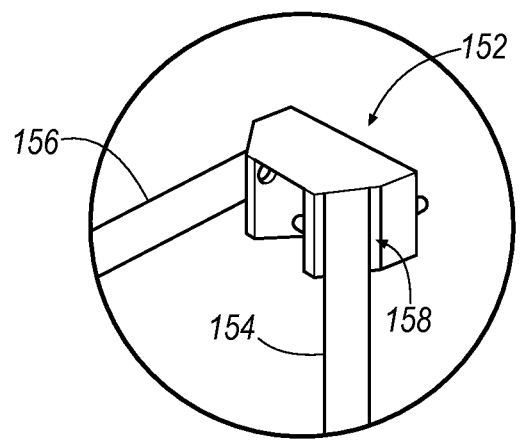
FIG. 6B is an enlarged perspective view of an exemplary elbow of the top frame according to FIG. 5.

As illustrated in FIGS. 5 and 6B, the elbows 152 may couple the top frame members 150 and the side frame members 112 together. The elbow 152 may include a three-way connector elbow 152, for example a three-way 90 degree connector as shown. The elbow 152 may be operable to receive and secure a mating end of the side frame member 112 and a mating end of respective top frame member components 154, 156 on either side thereof. For instance, the elbow 152 may include a fitting opening connector 158 oriented in a direction of the base for securely receiving the top end of a side frame member 112. The elbow 152 may include two pivot connectors 158 for receiving the elbow end of the top frame member components 154, 156. The pivot connectors 158 may pivotally couple the top frame members 150 to the corresponding side frame member 112 via the elbow 152. The pivot connectors 158 may include a pair of spaced apart loops or plates between which is accommodated a corresponding elbow end of the respective top frame member components 154, 156 for mating. The pair of loops or plates and the elbow end of the top frame member component 154, 156 may have aligned apertures accommodating a pivot pin for hinging the elbow 152 to the side frame member 112.

Figure 7:
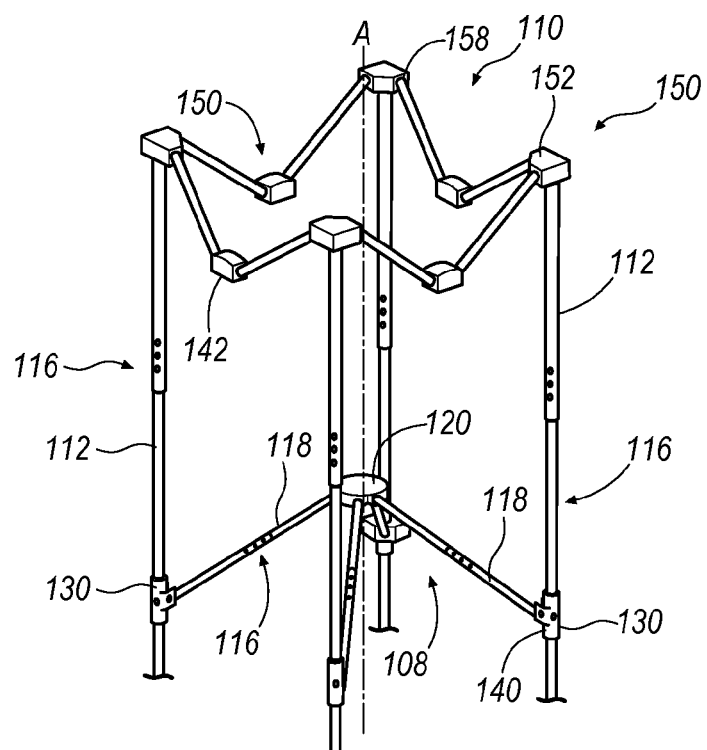
FIG. 7 illustrates a perspective view of the cart frame of the detachable cart in a partially collapsed state.

FIG. 7 illustrates an exemplary cart frame 102 in a partially collapsed state. As the cart 100 collapses, the base frame center plate 120 raises in a substantially vertical direction relative to a surface upon which the cart traverses whereas the side frame members 112 move inwardly to a relatively central position. The center plate 120 may be at a lowermost vertical position (e.g., substantially horizontal) when the cart 100 is in an un-collapsed state as shown in FIG. 2, while the center plate 120 may be at a highest vertical position in the collapsed state as shown in FIG. 7. That is, the center plate 120 may transition between a first vertical position and a second vertical position greater than the first vertical position in response to collapsing and un-collapsing the cart 100. The side frame members 112 are in an innermost position relative to the center axis A when the cart 100 is in the collapsed state (e.g., FIG. 7), and an outermost position when the cart 100 is fully open or in the un-collapsed state (e.g., FIG. 2). In order to collapse and un-collapse the cart 100, the base supports 118 pivot in both their couplings with the center plate 120 (e.g., via connecting elements 122) as well as in their couplings with the side frame members 112 (e.g., via the sleeve connection 130). According to an implementation, the hinged base frame members 136 and the top frame members 150 pivot in both their couplings to the side frame members 112 (e.g., via the sleeve connection 130 and the elbow 152 with respect to the base frame 108 and top frame 110, respectively) as well as between couplings of the two respective components (e.g., via the joint 142).

The center plate 120 may stop in the lowermost vertical position when the respective abutment surfaces 126 engage the corresponding base supports 118. That is, the center plate 120, via the abutment surface 126, engages the base supports 118 to stop and secure the center plate 120 in the lowermost vertical position for operation in the un-collapsed state. Additionally or alternatively, the joints 142 associated with at least one of the base frame 108 and the top frame 110 may act as a stop when the cart 100 is in the un-collapsed state. For example, the joint 142 of the base frame 108 may limit relative movement between the first component 138 and the second component 140 of the respective base frame members 136 when the first component 138 and second component 140 are in linear prolongation of one another. Accordingly, the abutment surface 126 of the center plate 120, the joint 142 of the base frame 108, the joint 142 of the top frame 110, or any combination thereof, may act to limit or stop movement of the cart frame 102 in the un-collapsed state.

Figure 8:
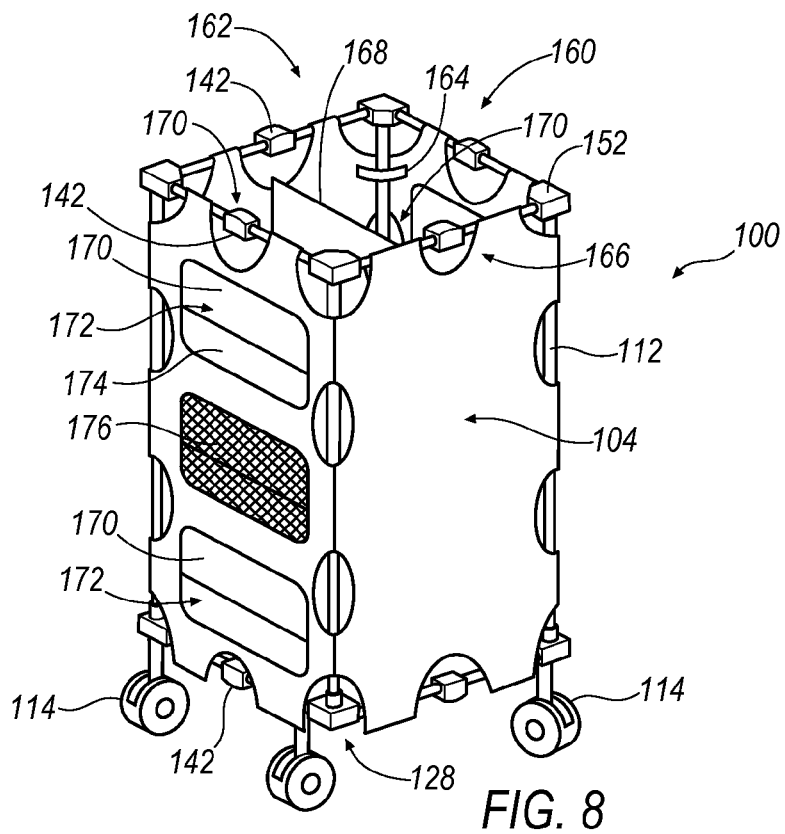
FIG. 8 illustrates a perspective schematic view of a detachable cart with an exemplary cargo basket.

Referring to FIG. 8, the cargo basket 104 or collection bin (hereinafter referred to as a cargo basket 104) may be attached to the cart frame 102. The cargo basket 104 may delimit an interior 160 of the cart 100 and define at least one opening 162 to receive items. The cargo basket 104 may include slots or straps 164 for receiving the side frame members 112 and the base supports 118 to securely attach the cargo basket 104 to the frame 102. The slots 164 may be integrated with the cargo basket 104 (e.g., sewn or otherwise formed as a component of the cargo basket 104). Additionally or alternatively, the slots 164 may be in the form of a securable strap to hold the side frame 106 and base frame 108 to the cargo basket 104 (e.g., via a hook and loop fastener combination such as Velcro® arranged on the strap 164 and corresponding region of the cargo basket 104). The inner diameter or cross-section of the slot 164 may be sized slightly larger than the outer diameter or cross-section of the side frame members 112 and the base supports 118 to ensure a tight/secure fit. The base of the cargo basket 104 may include an indicator (not shown) that may signify alignment of the cargo basket 104 when mounting on the base frame 108, in particular the center plate 120. As a non-limiting example, the base of the cargo basket 104 may have an indentation or some other form of insignia having a complementary geometry to the center plate 120, which may indicate alignment when the indentation fully encompasses the center plate 120.

The cargo basket 104 may include an upper portion 166 defining at least one inlet or opening 162. The upper portion 166 may include pockets at each of the corners for receiving the top of the side frame members 112 for similarly securing the basket 104 to the frame 102. Additionally, the upper portion of the basket 104 may include a deformable and/or resilient element extending along the upper periphery of the cargo basket 104 (e.g., delimiting the cross-section of the opening 162). For example, the deformable and/or resilient element may include a deformable and/or resilient wire that may be collapsed and expanded as the frame likewise collapses and expands during operation. Additionally or alternatively, the upper portion may include slots and/or straps for securing the cargo basket 104 to the top frame members 150.

When the cargo basket 104 is open or in the un-collapsed state, the interior opening 162 of the basket 104 may be substantially square in the horizontal cross-section and substantially rectangular in the vertical cross-section. Additionally, the cargo basket 104 may include at least one partition 168 to define more than one compartment 170 within the interior 160 of the cargo basket 104. For example, the partition 168 may extend the vertical extent (e.g., a direction along or parallel to the center axis of the cart 100) of the cargo basket 104 to divide the interior 160 cross-section of the cargo basket 104. Additionally or alternatively, the cargo basket 104 may include at least one longitudinally registered partition 168 (e.g., extending perpendicular relative to the center axis of the cart 100).

In the non-limiting example illustrated in FIG. 6, the cart 100 may include a partition 168 extending along or parallel to the center axis of the cart 100 to divide cargo basket 104 into two halves (e.g., equal or dissimilar halves) and two partitions 168 extending perpendicularly thereto to divide one of the halves into three sub-compartments 170. The cargo basket 104 may include one or more side openings 172 to access the interior of the sub-compartments 170. According to one example, the side opening(s) 172 may include a material guard 174 that at least partially closes the side opening 172. The interior sub-compartment(s) 170 may still be accessible via the side opening(s) 172, however the material guard 174 acts as a limit to prevent items from freely traversing the opening and possibly falling out of the cargo basket 104. Additionally or alternatively, the side opening(s) 172 may include a material cover flap 176 that can fold over and cover the side opening 172 when the sub-compartment 170 is not in use or during transportation to prevent items from traversing the side opening 172, for example. The material cover flap 176 may secure to the cargo basket 104 via a hook and loop fastener, a snap fastener, a zip fastener, or the like. A skilled artisan will appreciate that varying combinations of partitions 168 and compartments 170 are contemplated within the disclosure. Accordingly, the cargo basket 104 may be compartmentalized to facilitate organization of items while loading and transporting the items from one place to another.

The partitions 168 may be integrated with the cart 100, and particularly the cargo basket 104, e.g., via sewing or some other enduring securement. According to another non-limiting implementation, the partitions 168 may be removable and/or adjustable to vary the position in which the partition 168 is secured to the cargo basket 104 or to adjust the number of compartments 170/sub-compartments 170 desired. For instance, the partition 168 may include a fastener or adhesive (e.g., a hook, strap, Velcro®, etc.) that may latch or otherwise removably secure the partition 168 to the cargo basket 104, or vice versa. The partition 168 may be formed of a deformable and/or resilient material to allow the partition 168 to contort as the cart 100 transitions between the collapsed state and the un-collapsed state.

The cargo basket 104 may be composed of durable material that can withstand the wear and tear of receiving various cargo items. Additionally or alternatively, the cargo basket 104 may be composed of an elastic material to expand and contract in vertical extent, longitudinal extent and lateral extent along with the cart frame 102. The material may be formed from at least one of polyester, polyvinyl chloride (PVC), elastane, vinyl coated polyester, nylon, or other suitable material configured for durability and elasticity. The cargo basket 104, at least in sections, may include a mesh or otherwise substantially transparent fabric such that the interior compartment(s) 170 of the basket is visible.

The cart 100 may include a securing element, such as a hook and loop fastener (e.g., Velcro®) or button strap, for securing the cart frame 102 when the cart 100 is in the collapsed state. That is, the securing element may be configured to wrap around the side frame members 112 and/or the base supports 118 in a secure hold when the center plate 120 is in the uppermost or vertical position (e.g., when the cart 100 is collapsed). The securing element may be coupled to one of the side frame members 112 or a corresponding portion of the cargo basket 104 to be wrapped around and secure the cart 100 in the collapsed state. For instance, the securing element may be connected to a corner, e.g., a side frame member 112 or the corner of the cargo basket 104, and wrap around the perimeter of the cart 100 and reattach to the original corner (e.g., via a hook and loop fastener, a button, or other suitable fastener), thereby securing the cart 100 in a locked position. Accordingly, the cart 100 may be more easily stowed and transported in a compact manner.

Figure 9:
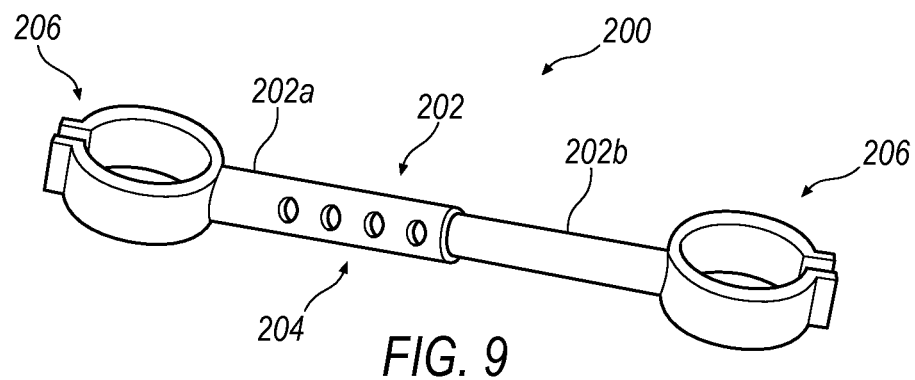
FIG. 9 illustrates a perspective view of a linking member according to one example.

Referring to FIGS. 1 and 9, the cart 100 may be attached to a carriage 10 (e.g., stroller, wheel chair, etc.) via at least one linking member 200. The linking member 200 may be pivotally coupled to the cart 100, e.g., via at least one of the side frame 106, the base frame 108, and cargo basket 104 to the rear axle or side frame of the carriage 10. Additionally, two linking members 200 may be pivotally extendable from the cart 100 to the frame of the carriage 10. Alternatively or additionally, the cart 100 may be configured to attach to the front of the stroller, e.g., attach on the front axle or front side frame. According to another example, the linking member 200 may extend from an attachment site arranged in a central region of the bottom of the cargo basket 104 and/or from the base frame member 136. For instance, the attachment site may include a plastic rod incorporated into the cargo basket 104 (e.g., a plastic rod sewn into the cargo basket 104). The distal end of the linking member 200 (e.g., the end closest in proximity to the detachable cart 100) may include a bracket or mating surface to directly connect to the cart 100.

Referring in particular to FIG. 9, the linking member(s) 200 may include an elongate arm 202 configured to increase or decrease a distance from the cart 100 to the carriage 10. The elongate arm 202 may include multiple telescoping sections 202a, 202b to adjust the elongation of the linking member 200 and a locking mechanism 116 to fix the telescoping sections 202a, 202b in position relative to one another. According to one example, an inner telescoping section 202a may include a resilient switch (e.g., a push button) operable to engage a series of periodic apertures disposed on an outer telescoping section 202b to adjust the elongation of the linking member 200. In this manner, the user may avoid hitting his or her feet on the cart 100 as they push the stroller. The linking member 200 may likewise include at least one adjustable clamp 206 that may be removably attached to the carriage 10. Additionally, the linking member 200 may include two adjustable clamps 206 disposed on opposite ends of the elongate arm 202, one clamp 206 operable to receive the carriage 10 and the other clamp 206 operable to receive the cart 100. The adjustable clamp (s) 206 may roll or rotate relative to the associated arm 202 via a bearing mechanism to compensate for misaligned connections to the carriage 10 and/or the cart 100. The adjustable clamp(s) 206 may also adjust in size (e.g., the cross-section or diameter enlarged or decreased) to fit variously sized carriages 10 and/or frame parts. Thus, the linking arm 202, via the adjustable clamp(s) 206, may universally be used to fittingly secure the cart 100 to a variety of strollers, wheel chairs, carriages, etc., with differing frame and axle thickness or girth.

Figure 10:
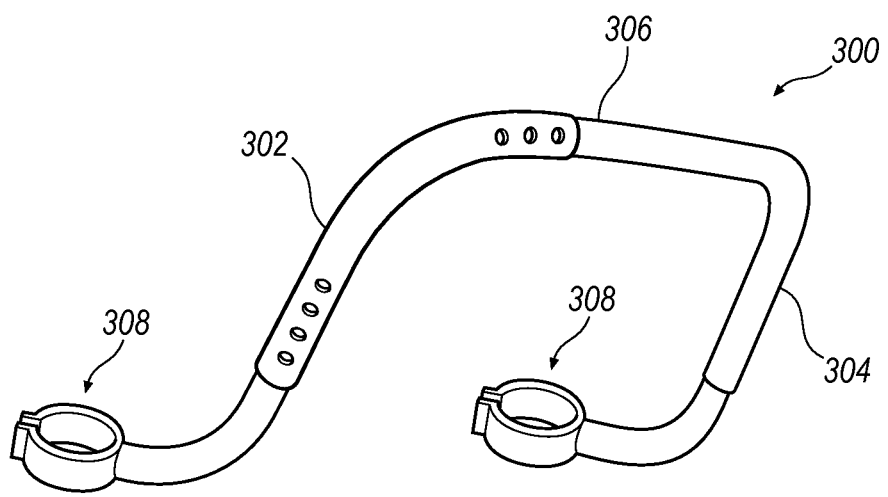
FIG. 10 illustrates an attachable handlebar for use in connection with the detachable cart according to FIG. 1.

As illustrated in FIG. 10, in order to avoid hitting one's feet against the cart 100 while pushing the carriage 10, an attachable handlebar 300 may be secured to the carriage 10 that may vary a distance by which a user may stand in order to push the carriage 10. The handlebar 300 may couple to a pre-existing handle of a carriage 10 and accordingly assume the function of the carriage handle. The handlebar 300 may include at least one arm 302, and in the example illustrated in FIG. 10 at least two arms 302, 304, for mounting the carriage 10 that may merge into a crossbar 306. The crossbar 306 may couple the arms 302, 304 pursuant to an implementation including a plurality of arms 302, 304. Alternatively, the arm 302 and associated crossbar 306 may be separate from another arm 304 and associated crossbar 306. The crossbar 306 may be ergonomically designed for comfort and load bearing to withstand the force of pushing a carriage 10 and accompanying cart 100. The handlebar 300 may be a unitary structure, or may be composed of multiple components. The arms 302, 304 may include a coupling 308, for example a clamp and/or a hook and loop fastener such as Velcro®, operable to secure the handlebar 300 to the carriage 10. The coupling 308 may be operable to roll or rotate relative to the associated arm 302, 304 via a bearing mechanism to compensate for misaligned connections and/or compensate for awkward alignment between the handlebar 300 and the connecting portion of the carriage 10.

In accordance with the example illustrated in FIG. 10, the arms 302, 304, the crossbar 306, or a combination thereof may be adjustable to change in extent. For instance, the arms 302, 304 may include two telescoping section operable to elongate and constrict, and have a locking mechanism 116 to fix the arms 302, 304 in a set position. Thus, the arms 302, 304 may be adjusted depending on the reach or desire of a user. That is, the further the arms 302, 306 elongate, the further the crossbar 306 extends away from the carriage 10 for the user to grasp and push. Additionally or alternatively, the crossbar 306 may be adjustable to change in length, thereby varying a length separating the two arms 302, 304, such that the handlebar 300 may be used with a variety of sized carriages 10.

Therefore, the portable, detachable cart 100 according to the disclosure may include a collapsible frame 102, a cargo basket 104, a linking member 200 and an attachable handlebar 300. The collapsible frame 102 may include a base frame 108 having a center plate 120, a plurality of supports 118 pivotally coupled to the center plate 120, and hinged base frame members 136. Likewise, the collapsible frame 102 may include a plurality of side frame members 112 pivotally coupled to the supports 118 of the base frame 108. Additionally, the frame 102 may include a top frame 110 including a plurality of top frame members 150. The side frame members 112, the base supports 118, the base frame members 136, the top frame members, or any combination thereof may be received in slots or straps 164 of the cargo basket 104 for securely fixing the cargo basket 104 to the collapsible frame 102. A plurality of wheel assemblies 114 may extend from at least one of the base frame 108 and the side frame 106 to support the cart 100 on a surface which it traverses. The cargo basket 104 may include a partition 168 that may compartmentalize the interior 160 to define more than one compartment 170. The cart 100 may be configured to transition between a collapsed state, in which the center plate 120 is in an uppermost position and the side frame members 112 are in an innermost position, and an un-collapsed state, in which the center plate 120 is in a lowermost position and the side frame members 112 are in an outermost position. The cart 100 may be adjustable to elongate in at least one of a vertical extent, a longitudinal extent, and a lateral extent.

At least one linking member 200 may be configured to attach the cart 100 to a carriage 10, such as a stroller or wheel chair. The linking member 200 may include an elongate arm 202 and at least one adjustable clamp 206. Accordingly, the cart 100, via the linking member 200, may be universally attached to various carriages 10. An attachable handle bar 300 may be coupled to the carriage 10 via a pair of couplings 308 disposed on a plurality of arms 302, 304 that may merge into a crossbar 306 to assist in pushing the carriage 10 without being obstructed by the cart 100.

Accordingly, it is to be understood that the above description is intended to be illustrative and not restrictive. Many embodiments and applications other than the examples provided would be apparent upon reading the above description. It is anticipated and intended that future developments will occur in the arts discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. Likewise, the use of the words "first", "second", etc. may be interchangeable.

What is claimed is:

1. A collapsible cart for attaching to a transportable person carriage, comprising:
   a cargo basket defining an interior and including at least one opening;
   a cart frame mounting the cargo basket, the cart frame including:
      a base frame having a plurality of supports extending from a center plate, the supports pivotally coupled to the center plate, wherein the plurality of supports are respectively composed of at least two telescoping parts configured to adjust the respective supports between a first length and a second length greater than the first length;
      a side frame defining a periphery of the cart frame and having a plurality of side frame members pivotally coupled to the respective supports of the base frame, wherein the base frame and side frame are selectively collapsible between a collapsed state and an un-collapsed state, such that in the collapsed state the center plate is in an uppermost position and in the un-collapsed state the center plate is in a lowermost position relative to a surface; and
      a plurality of wheel assemblies extending from at least one of the base frame and the side frame; and
   at least one linking member extending from at least one of the base frame, the side frame and the cargo basket.

2. The cart of claim 1, wherein the at least one linking member includes an adjustable clamp configured for attachment to at least one of an axle and a frame of the transportable person carriage.

3. The cart of claim 1, wherein the plurality of supports respectively include a locking mechanism configured to fix the at least two telescoping parts in at least one position between the first length and the second length.

4. The cart of claim 1, wherein the base frame includes a plurality of peripheral base frame members respectively connecting one of the plurality of side frame members to another of the plurality of side frame members peripherally adjacent thereto, the base frame members respectively including a first component pivotally coupled to a second component via a joint, the joint coupling adjacent ends of the first component and the second component and configured to permit pivoting movement in one direction only from a position in which the first component and the second component are in linear prolongation of one another.

5. The cart of claim 1, wherein the side frame members are coupled to the associated supports of the base frame via a pivot connection, the respective pivot connections are slidable relative to the frame member in a direction along a center axis of the cart frame.

6. The cart of claim 1, further comprising an attachable handlebar for attaching to the transportable person carriage, the handlebar including at least one adjustable arm moveable between a first extent and a second extent greater than the first extent.

7. The cart of claim 1, wherein the cargo basket includes at least one partition dividing the interior, the partition extending at least one of parallel and perpendicular to a center axis of the cart.

8. The cart of claim 7, wherein the at least one partition extends parallel to the center axis dividing the interior into two compartments, wherein one compartment includes a second partition extending perpendicular to the center axis dividing the one compartment into two sub-compartments, and at least one side opening arranged on the cargo basket configured to permit access from an exterior of the cargo basket to at least one of the two sub-compartments.

* * * * *